United States Patent
Schneider et al.

[11] Patent Number: 6,065,757
[45] Date of Patent: May 23, 2000

[54] FLYWHEEL HOUSING

[75] Inventors: Marvin P. Schneider, East Peoria; Eric D. Hardin, Peoria; David L. Oedewaldt, Hanna City, all of Ill.

[73] Assignee: Caterpillar Inc., Peoria, Ill.

[21] Appl. No.: 09/109,796

[22] Filed: Jul. 2, 1998

[51] Int. Cl.[7] ..................................................... F02F 11/00
[52] U.S. Cl. .......................... 277/641; 277/642; 277/598
[58] Field of Search .................................. 277/641, 591, 277/594, 596, 598, 642, 630

[56] References Cited

U.S. PATENT DOCUMENTS

| | | | |
|---|---|---|---|
| 1,630,675 | 5/1927 | Sinclair | 277/641 X |
| 2,945,715 | 7/1960 | Burrell | 277/598 |
| 3,565,049 | 2/1971 | Bauer . | |
| 4,192,520 | 3/1980 | Hasegawa | 277/641 X |
| 4,499,869 | 2/1985 | Visek . | |
| 4,593,659 | 6/1986 | Wells et al. . | |
| 4,599,976 | 7/1986 | Meuret . | |
| 4,607,601 | 8/1986 | Kohler . | |
| 4,610,228 | 9/1986 | Fink et al. . | |
| 4,636,155 | 1/1987 | Francis | 277/642 X |
| 4,669,432 | 6/1987 | Harada | 123/198 E |
| 4,716,870 | 1/1988 | Wilson . | |
| 4,814,953 | 3/1989 | Joh | 277/598 X |
| 4,928,980 | 5/1990 | Deuring . | |
| 4,929,204 | 5/1990 | Shiozawa | 440/112 |
| 4,930,792 | 6/1990 | Glück et al. | 277/598 |
| 5,076,557 | 12/1991 | Beatenbough et al. | 277/598 X |
| 5,080,058 | 1/1992 | Ferrazzi | 277/641 X |
| 5,226,787 | 7/1993 | Freeman . | |
| 5,330,200 | 7/1994 | Unseth . | |
| 5,662,337 | 9/1997 | Surbrook et al. | 277/594 |

*Primary Examiner*—Anthony Knight
*Assistant Examiner*—Mark Williams
*Attorney, Agent, or Firm*—Larry G. Cain; James B. Golden

[57] ABSTRACT

A flywheel housing adapted for use with an engine. The engine has a cylinder block and the cylinder block defines a mating portion. The flywheel housing has a groove with an elastomeric seal disposed therein. The groove has an arcuate portion and a pair of leg portions and is in sealing engagement with the mating portion. The principle use is for flywheel housing made of aluminum, however any flywheel housing that has thermal stresses or encounters vibrational loads will benefit from this invention.

11 Claims, 2 Drawing Sheets

Fig. - 1 -
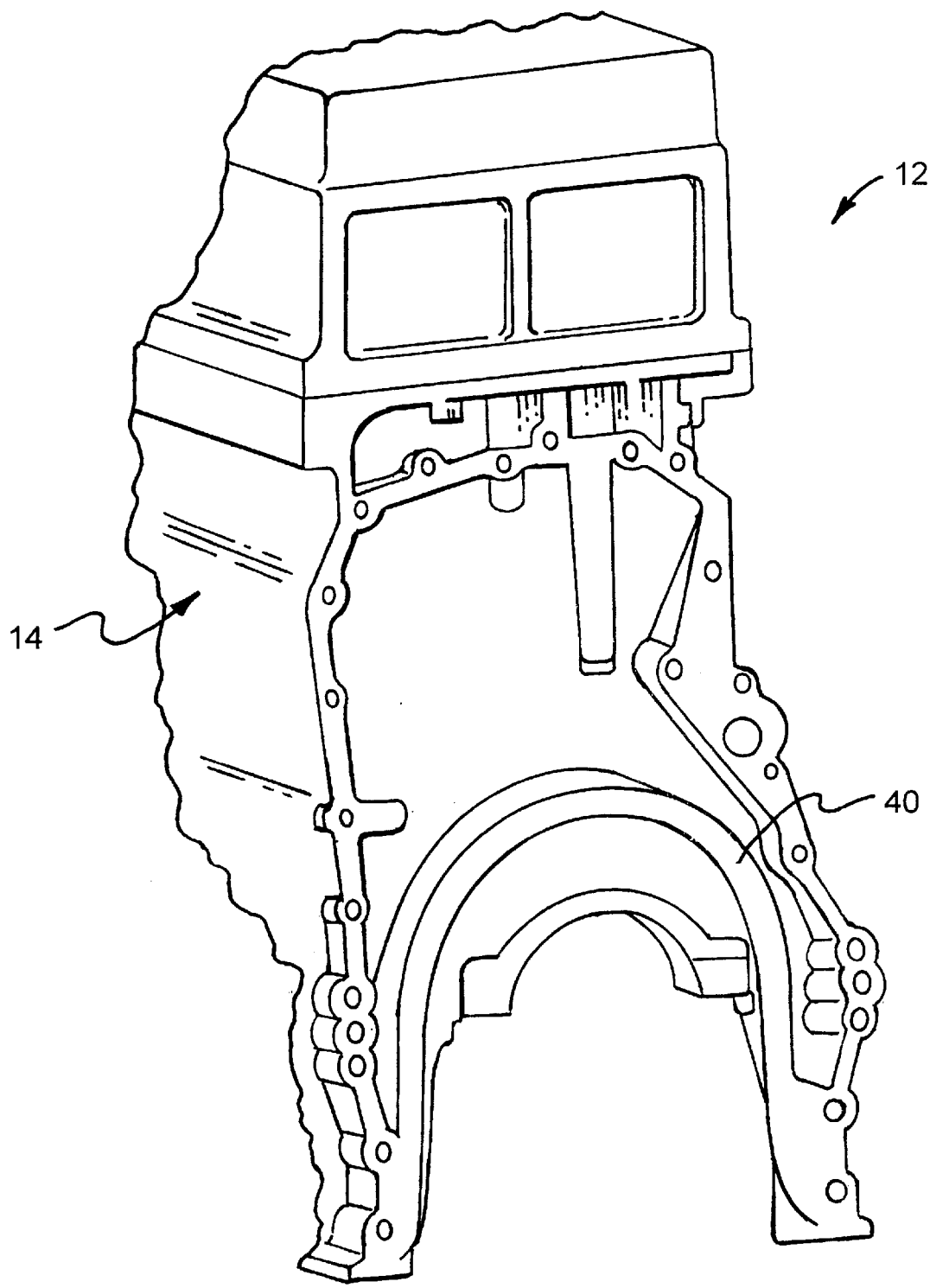

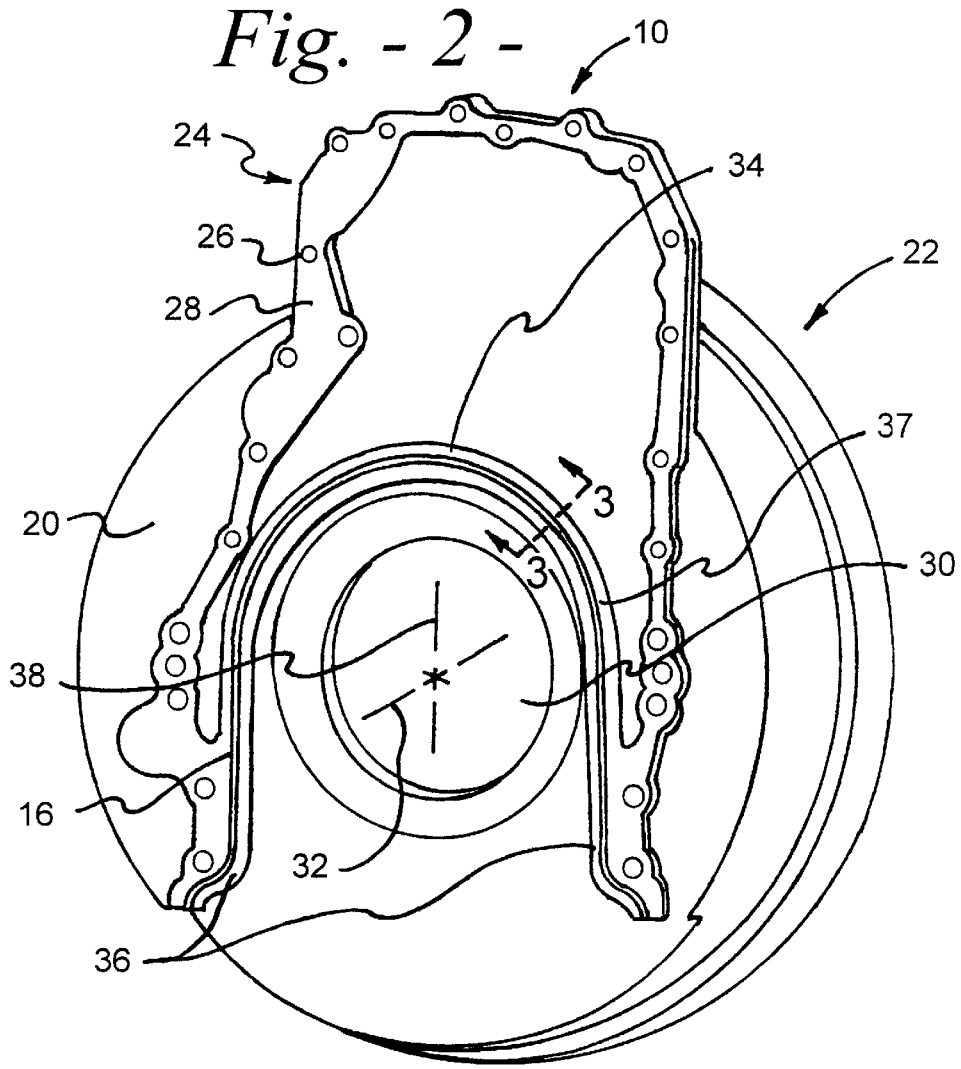
Fig. - 2 -
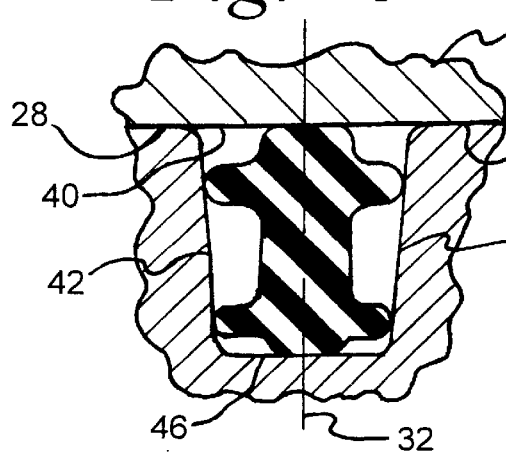
Fig. - 3 -
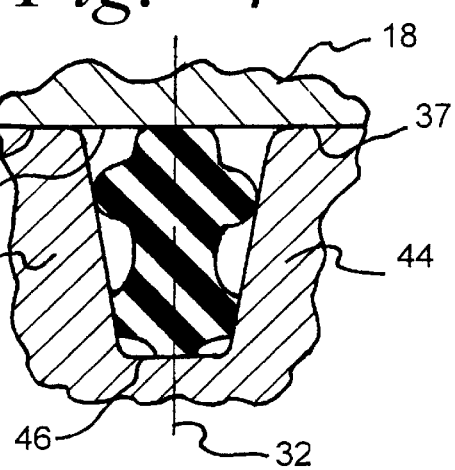
Fig. - 4 -

FLYWHEEL HOUSING

TECHNICAL FIELD

This invention relates generally to a flywheel housing, and more particularly to a groove having an arcuate portion and a pair of leg portions being used for sealing.

BACKGROUND ART

Engineers are designing flywheel housings that are lighter weight and less costly. Over the years engineers have discovered that weight and cost reductions are achieved by manufacturing flywheel housings out of aluminum. During normal operation of an engine, cyclic temperature changes can cause thermal expansion and contraction of various components at varying rates. The use of components made of different materials adds to the relative movement between components. For example, the flywheel housing experiences thermal expansion greater than the thermal expansion of a cylinder block causing relative movement between the flywheel housing and the cylinder block. The relative movement between the flywheel housing and the cylinder block, if not absorbed by a seal positioned between the two components, can cause the flywheel housing or seal to leak, crack or can destroy connecting bolts used for connecting the flywheel housing to the cylinder block. The harsh environment that the seal is in also adds to seal degradation. Having seals exposed to hot engine oil degrades the seal and reduces reliability. Prior techniques of compensation for thermal stresses, operating vibration, and harsh environments are achieved by using gaskets and integral seals. The gaskets and integral seals that are known in the art have a tendency to fatigue and leak over time due to the excessive stresses and the hot engine oil.

The present invention is directed to overcoming one or more of the problems set forth above.

DISCLOSURE OF THE INVENTION

A flywheel housing is adapted for use with an engine. The flywheel housing has a first side and a second side spaced therefrom. The flywheel housing comprises an opening that is defined between the first and second sides. The opening has a longitudinal axis. An axial axis is perpendicular to the longitudinal axis. A groove has an arcuate portion and a pair of leg portions. The arcuate portion is defined radially about the longitudinal axis, and the pair of leg portions are spaced from the axial axis.

An engine has a block, and the block defines a mating portion. A flywheel housing has a first side and a second side spaced therefrom. An opening is defined between the first and second sides and the opening has a longitudinal axis. An axial axis is perpendicular to the longitudinal axis. A groove has an arcuate portion and a pair of leg portions. The arcuate portion is defined radially about the longitudinal axis, and the pair of leg portions are spaced from the axial axis.

BRIEF DESCRIPTION OF THE DRAWINGS

FIG. 1 is an isometric view of a portion of a cylinder block;

FIG. 2 is an isometric view of a flywheel housing embodying the present invention;

FIG. 3 is a partial cross sectional view of a groove taken along line 3—3 of FIG. 2; and FIG. 4 is a partial cross sectional view of another embodiment of a groove taken along line 3—3 of FIG. 2.

BEST MODE FOR CARRYING OUT THE INVENTION

Referring to FIGS. 1 and 2, a flywheel housing 10 adapted for use with an engine 12 and cylinder block 14 are shown. The flywheel housing 10 utilizes a groove 16 and an elastomeric seal 18 between the flywheel housing 10 and the cylinder block 14.

The flywheel housing 10 as shown in FIG. 2 is made of an aluminum alloy. However, it should be understood that flywheel housings 10 are also applicable with other types of materials, such as steel, iron, and/or cast iron and cast steel that are well known in the art. The flywheel housing 10 has a first side 20 and a second side 22 spaced therefrom. The first side 20 has a fastening portion 24 that is defined by a plurality of bolt holes 26 and a mounting surface 28. The mounting surface 28 is flush with the cylinder block 14 for proper fit-up. It is this mounting surface 28 that prior techniques attached gaskets and integral seals. The flywheel housing 10 is attached to the cylinder block 14 using the plurality of bolt holes 26 and fasteners (not shown). Having the mounting surface 28 in close proximity to the plurality of bolt holes 26 would require the mounting surface 28 to be increased in cross-sectional area to maintain the same level of sealability between the flywheel housing 10 and the cylinder block 14 to maintain the proper tightening torque. An opening 30 is defined between the first and second sides 20, 22. The opening 30 has a longitudinal axis 32. The opening 30 is sized large enough to allow assembly of a crankshaft (not shown). The groove 16 defines an arcuate portion 34, a pair of leg portions 36, and a top surface 37. The groove 16 is shown disposed in the flywheel housing 10, however the groove could be disposed in the cylinder block 14 without departing from the spirit of the invention. The pair of leg portions 36 have extremities contacting the mounting surface 28. However, it should be understood that grooves 16 having extremities spaced apart from the mounting surface 28 is also applicable without departing from the spirit of the invention. The top surface 37 and the mounting surface 28 are at equal heights measured from an axial axis 38. However, it should be understood that groove 16 having the top surface 37 at a different height from the mounting surface 28 is also applicable without departing from the spirit of the invention. The groove 16 is spaced from the fastening portion 24 which allows the cross-sectional area of the fastening portion 24 to be optimized for fastening of the flywheel to the cylinder block 14. The arcuate portion 34 is defined radially about the longitudinal axis 32. However, the arcuate portion 34 could generally be defined as having a horizontal portion or having a pointed configuration without departing from the spirit of the invention. The pair of leg portions 36 are spaced from the axial axis 38 that is perpendicular to the longitudinal axis 32. However, it should be understood that the groove 16 could be located at a less central location and still provide proper sealing between the flywheel housing 10 and the cylinder block 14. The cylinder block 14 defines a mating portion 40. The mating portion 40 is shown disposed in the cylinder block 14, however the mating portion 40 could be disposed in the flywheel housing 10 without departing from the spirit of the invention. The mating portion 40 is opposite the groove 16 and is in sealing engagement with the elastomeric seal 18 which is disposed in the groove 16.

Referring to FIG. 3, The groove 16 is shown with the elastomeric seal 18 disposed therein. The elastomeric seal 18 that is shown is a beaded elastomeric seal 18. However, it should be understood that the invention is applicable to other type of seals, such as O-ring or seals that are well known in the art. The groove 16 has a first wall surface 42 and a second wall surface 44 extended from the mounting surface 28 a pre-established distance. A bottom wall surface 46 connects the first and second wall surfaces 42, 44 at the pre-established distance. At least a portion of the first and second wall surfaces 42, 44 are parallel to the longitudinal axis 32 which provides the needed surface structure to trap the elastomeric seal 18 in the groove 16. However, it should be understood that the invention is applicable to other wall orientations, such as having at least a portion of the first and second walls with opposing slopes.

INDUSTRIAL APPLICABILITY

With reference to the Figs. and in operation, fatiguing of the elastomeric seal 18 between the flywheel housing 10 and the cylinder block 14 caused by thermal stresses, operating vibration, and harsh environment are prevented by the groove 16. For example, the elastomeric seal 18 within the groove 16 provides sealing and allows relative movement between the flywheel housing 10 and the cylinder block 14, the pair of leg portions 36 spaced symmetrically provides uniformity in sealing, thus groove 16 positioned at a more central location about the opening 30 of the flywheel housing 10 reduces the scrubbing motion, and the elastomeric seal 18 supported by the groove 16 and mating portion 40 protects the elastomeric seal 18 from the harsh environment and reduces bonding failures. The groove 16 improves sealing between the flywheel housing 10 and the cylinder block 14 for thermal stresses, operating vibration, and harsh environment that are normally present during engine operation than previous techniques. The ability to have the elastomeric seal 18 disposed in the groove 16 reduces costs that are associated with sealing the flywheel housing 10 and cylinder block 14. Having the groove 16 centrally located reduces the scrubbing motion of the seal which prolongs the life of the elastomeric seal 18.

In operation, the elastomeric seal 18 is disposed in the groove 16. The flywheel housing 10 is fastened to the cylinder block 14 using the plurality of bolt holes 26 and appropriate fasteners that are well known in the art. Fastening of the flywheel housing 10 to the cylinder block 14 places the mating surface 40 in sealing engagement with the elastomeric seal 18.

As discussed above, the flywheel housings 10 using the groove 16 with the elastomeric seal 18 disposed therein allows proper sealing of the flywheel housings 10 while still permitting relative movement between the flywheel housing 10 and the cylinder block 14. The groove 16 simplifies assembly of the flywheel housing 10 by eliminating the application of sealant that is used with prior techniques. Having the elastomeric seal 18 disposed in the groove 16 and in sealing engagement with the mating surface 40 provides four surfaces for sealing and improves protection of the elastomeric seal 18 from the harsh environment when compared with prior technique, that are well known in the art. The central location of the groove 16 with the opening 30 improves the sealability, life, and packaging of the flywheel housing 10.

Other aspects, objects and advantages of this invention can be obtained from a study of the drawings, the disclosure and the appended claims.

What is claimed is:

1. A flywheel housing for use with an engine having a mating portion, said flywheel housing having a mounting surface, a first side and a second side spaced therefrom, said flywheel housing comprising:

an opening being defined between said first and second sides, said opening having a longitudinal axis;

an axial axis being perpendicular to said longitudinal axis;

a groove having a generally arcuate portion and a pair of leg portions, said arcuate portion being defined radially about said longitudinal axis, said pair of leg portions being spaced from said axial axis, and said groove having a first and second wall surfaces, and a bottom wall surface connecting said first and second wall surfaces;

an elastomeric seal disposed in said groove, said seal being supported by said first, second, and bottom wall surfaces of said groove; and said mating portion of said engine engaging said mounting surface of said flywheel housing and being in sealing engagement with said elastomeric seal.

2. A flywheel housing, as set forth in claim 1, wherein at least a portion of said first and second wall surfaces being parallel to said longitudinal axis.

3. A flywheel housing, as set forth in claim 1, wherein at least a portion of said first and second wall surfaces having opposing slopes.

4. A flywheel housing, as set forth in claim 1, wherein said flywheel housing having a fastening portion being defined by a plurality of bolt holes and a sealing surface.

5. A flywheel housing, as set forth in claim 4, wherein said groove being positioned within said sealing surface.

6. A flywheel housing, as set forth in claim 4, wherein said fastening portion being spaced from said groove.

7. A flywheel housing, as set forth in claim 1, wherein said leg portions being symmetrically spaced about said axial axis.

8. An engine having a cylinder block, and said cylinder block defining a mating portion, said engine comprising:

a flywheel housing having a mounting surface, a first side and a second side spaced therefrom;

an opening being defined between said first and second sides and said opening having a longitudinal axis;

an axial axis perpendicular to said longitudinal axis;

a groove being in one of said cylinder block and said flywheel housing having an arcuate portion and a pair of leg portions, said arcuate portion being defined radially about said longitudinal axis, said pair of leg portions being spaced from said axial axis, and a bottom wall surface connecting said first and second wall surfaces;

an elastomeric seal disposed in said groove, said seal being supported by said first, second, and bottom wall surfaces of said groove; and said mating portion of said cylinder block engaging said mounting surface of said flywheel housing and one of said mating portion or mounting surface being in sealing engagement with said elastomeric seal.

9. An engine, as set forth in claim 8, wherein said flywheel housing having a fastening portion being defined by a plurality of bolt holes and a sealing surface.

10. An engine, as set forth in claim 9, wherein said sealing surface being flush with said block.

11. An engine, as set forth in claim 8, wherein said mating portion being in sealing engagement with said elastomeric seal.

* * * * *